Sept. 4, 1928.
J. L. CREVELING
LUBRICATING MEANS
Filed May 28, 1924
1,682,890
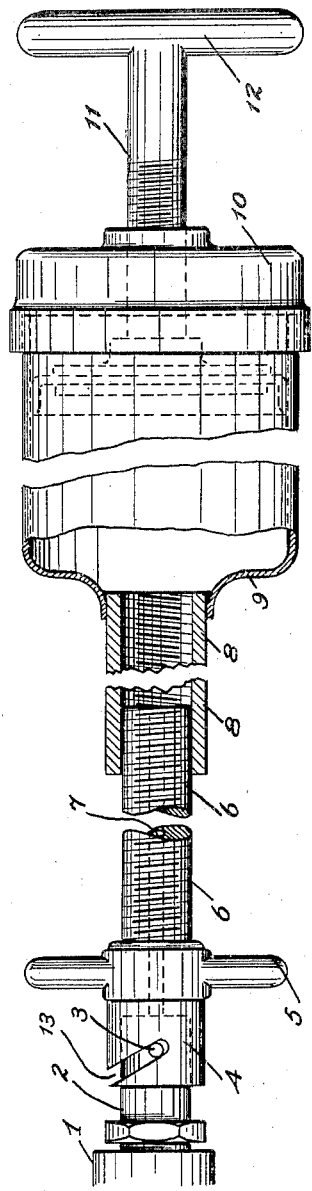
Fig. I.
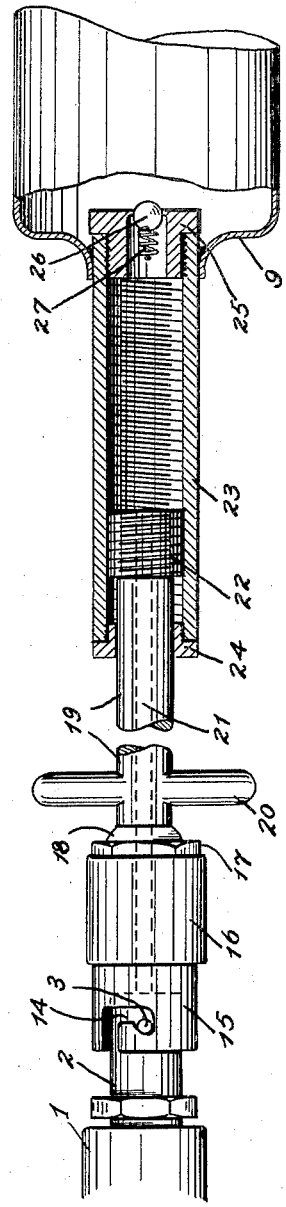
Fig. II.
INVENTOR.
John L. Creveling Patented Sept. 4, 1928.

1,682,890

UNITED STATES PATENT OFFICE.

JOHN L. CREVELING, OF ORACLE, ARIZONA, ASSIGNOR, BY MESNE ASSIGNMENTS, TO THE BASSICK MANUFACTURING COMPANY, OF CHICAGO, ILLINOIS, A CORPORATION OF DELAWARE.

LUBRICATING MEANS.

Application filed May 28, 1924. Serial No. 716,404.

My invention pertains to that class of lubricating means employed for forcing a lubricant between bearing surfaces under pressure, and has for its particular object to provide simple and effective means whereby this may readily be accomplished, and, when necessary, an extremely high pressure may be exerted upon the lubricant.

Fig. I is a partial section and partial elevation of a structure comprehending one embodiment of my invention.

Fig. II is a partial elevation and partial section of a modified structure containing an embodiment of my invention.

Referring to the drawing, 1 represents a portion of a device of any type into which it is desired to force a lubricant and in this instance, is indicated as a nipple which may have any of the usual forms of passage or ducts communicating with the surfaces to be lubricated. This nipple is shown as provided with means for operatively connecting my invention with the part to be lubricated and, in this instance, is portrayed in the form of the well-known "Alemite" fitting, as provided with the cylindrical portion 2 and pins 3, as more fully shown and described in patent to Gullborg, No. 1,307,734, issued June 24, 1919, since my device is very useful for supplying lubricant through this type of nipple notwithstanding the particular type of connection used forms no part of my present invention which is applicable to any type of connection whereby it may be operatively united with the part to be lubricated.

In Fig. I a sleeve 4 is shown as fitting upon the nipple 2 and provided with projections 5 whereby it may be readily applied and held on the said nipple, as will hereinafter be pointed out. The parts 4 and 5 are carried by an externally threaded stem 6, having throughout a bore or conduit 7, adapted to operatively communicate with the nipple 2, as indicated in dotted lines. The member 6 is threaded into the bore of the sleeve or cylinder 8, communicating with the interior of the compresser 9, which may be of the usual type now well-known in the art, which may be filled with lubricant by removal of the cap 10, and from which the lubricant may be expelled under considerable pressure by rotating the screw-threaded stem 11 as by means of the handle 12, the said stem 11 being threaded into the cap 10 and provided with the usual piston indicated in dotted lines in the figure. 13 is an inclined slot cut in the sleeve 4 through the instrumentality of which rotation of the said sleeve may cause a pressure-tight joint between the end of the nipple 2 and any suitable gasket or other means, as now well-known in the art, which may be carried within the sleeve 4.

In Fig. II the sleeve 15 is shown as provided with the usual bayonet-joint slots adapted to engage the pins 3 of the nipple 2, as indicated, in such manner as to hold the sleeve 15 locked thereupon while in use. The said sleeve 15 and its expanded portion 16 may contain any of the usual means whereby a pressure-tight joint is insured with the nipple 2, and as such devices are now well-known in the art, and one is illustrated in the previously mentioned Gullborg patent, the specific means whereby this joint is maintained is not shown in the present drawing as any of the well-known types of structure for this purpose may be employed. The expanded portion 16 has operative connected therewith the stem 19 provided with the extensions 20, as by means of any suitable flexible connection, in this instance indicated as the ball-joint comprising the ball member 18 and the nut 17. The stem 19 passes freely through the member 24 and is provided at its extremity with an expanded portion 22 screw-threaded into the bore of the sleeve or cylinder 23 which is attached as shown to the barrel or cylinder portion of the pump or compressor 9. The bushing 25 is screwed into the end of the sleeve 23 and is provided with a ball-valve 26, normally held in the position indicated in the drawing by the spring 27.

An operation of my invention, as portrayed in Fig. I, is substantially as follows:

When desired to force a lubricant into the apparatus indicated at 1, the sleeve 4 is placed upon the nipple 2 with the slots 13 engaging the pins 3 and rotated in a right-hand direction, as by means of the extensions 5. so as to cause a pressure-tight joint against the end of nipple 2. Then, while the barrel 9 is held in one hand, the handle 12 and its shaft 11 are rotated by the other hand in such manner as to force the lubricant contained within the cylinder 9 through the bore of the sleeve 8 and through the bore 7 of the sleeve 6 and through the nipple 2 into the parts to be lubricated. And, if desired, during this operation the barrel 9 and parts connected therewith may be held so as to maintain the tight joint with the nipple 2 by allowing the said parts to tend to revolve upon the nipple 2 in such manner that the inclined surfaces forming one side of the slots 13 will cooperate with the pins 3 to maintain a tight joint, in an obvious manner; and, unless too high a resistance to the passage of the lubricant into the parts to be lubricated be encountered, they may be readily lubricated as above outlined. However, should the resistance be sufficient that the operation of the large piston by means of the handle 12 cannot be readily accomplished, the cylinder 9 and sleeve 8 may be allowed to revolve with the handle 12 or may be grasped and revolved instead of the handle, whereupon the screw-threaded connection between the members 6 and 8 will cause the member 6 to travel inwardly within the bore of the member 8 so as to form a hollow plunger of small area which, on account of its area and properly chosen pitch of thread, may cause an extremely high pressure upon the lubricant and force the same through the nipple 2, in an obvious manner, even though this could not be accomplished through the instrumentality of the piston of large area within the barrel 9 when operated by hand. While revolving the barrel 9, as outlined above, to exert this high pressure, the pins 3, of course, may be relieved of as much strain as desired by grasping the extensions 5 with one hand, as will be perfectly plain.

An operation of the structure shown in Fig. II is substantially the same as that shown in Fig. I with the exception that the bayonet-joint indicated at 14 and means cooperating therewith to preserve a fluid-tight joint with the nipple 2 will act automatically, when the sleeve 15 is made up upon the nipple 2, as indicated, and require no attention, as outlined when using the inclined slot 13 of Fig. I, while the ball-joint shown at 17—18 will allow the compressor 9 and elements cooperating therewith to be moved in various positions which may be desired in practice. And while rotating the barrel 9 to cause the expanded portion 22 of the stem 19 to travel inwardly in the bore of the tube 23, it will be necessary to hold the stem 19 from revolving in the ball-joint 17—18, as by means of the extensions 20 provided for this purpose. Further, the ball-valve indicated at 26 will prevent the excessive pressure within the small cylinder 23 from being exerted upon the walls of the compressor 9 and against the piston thereof, in an obvious manner.

From the foregoing it will be noted that I have produced a simple and effective means whereby a lubricant may be forced with reasonable rapidity against a reasonable resistance by means of an ordinary pump or compressor which is so constructed that when a high resistance is encountered it can instantly be changed into a high pressure pump or compressor and a lubricant more slowly forced against an extremely high pressure by means of an operation by hand which is almost identical with the operation of the pump against low pressure, so as to form a very useful and handy means of lubrication under the circumstances to be met in practice.

I do not wish in any way to limit myself to the exact constructions or modes of operation employed above merely to illustrate embodiments of my invention as it is obvious that wide departure in details as well as operation may be made without departing from the spirit and scope of my invention which is as set forth in the following claims:

1. Lubricating means comprising lubricant containing means, means for expelling a lubricant therefrom, means for receiving said lubricant and exerting increased pressure upon the same, a discharge conduit for said high-pressure means, a coupling means attached to said discharge conduit and adapted for making a connection with a lubricant receiving means, and projecting means secured to said coupling means and adapted to be manipulated during the operation of said lubricating means for preventing the application of undue force to parts of said lubricant receiving means.

2. Lubricating apparatus of the class described, comprising, in combination, a lubricant container, means for expelling lubricant therefrom, means for increasing the pressure on the lubricant discharged from said container, coupling means for receiving the lubricant discharged from said container, said coupling means including interlocking means for effecting a variable pressure seal with a lubricant receiving member, and a single handle for causing said expelling means to force lubricant from said container, said pressure increasing means to increase the pressure of the lubricant thus discharged, and said interlocking means to increase the sealing pressure between said coupling means and said lubricant receiving member.

JOHN L. CREVELING.